(12) United States Patent
Zeidän

(10) Patent No.: US 6,379,046 B1
(45) Date of Patent: Apr. 30, 2002

(54) MODULAR SUPPORT STRUCTURE FOR HYDRODYNAMIC BEARING

(75) Inventor: Fouad Y. Zeidän, Pearland, TX (US)

(73) Assignee: KMC, Inc., West Greenwich, RI (US)

( * ) Notice: Subject to any disclaimer, the term of this patent is extended or adjusted under 35 U.S.C. 154(b) by 0 days.

(21) Appl. No.: 09/708,990

(22) Filed: Nov. 8, 2000

(51) Int. Cl.[7] ............................................. F16C 17/06
(52) U.S. Cl. ....................................................... 384/117
(58) Field of Search ................................. 384/117, 309, 384/312, 311, 310

(56) References Cited

U.S. PATENT DOCUMENTS 4,676,668 A * 6/1987 Ide .............................. 384/117
5,556,208 A * 9/1996 Ide .............................. 384/117

* cited by examiner

Primary Examiner—Lenard A. Footland
(74) Attorney, Agent, or Firm—Salter & Michaelson

(57) ABSTRACT

A hydrodynamic bearing is constructed having a modular bearing pad support system which provides flexure pivot motion about an axis parallel to the axis of rotation of the supported shaft to provide hydrodynamic performance and a rocking motion about an axis transverse to the axis of rotation of the supported shaft to provide tolerance to misalignment and bending of the shaft.

3 Claims, 7 Drawing Sheets

MODULAR SUPPORT STRUCTURE FOR HYDRODYNAMIC BEARING

BACKGROUND OF THE INVENTION

Hydrodynamic radial bearings are generally constructed with pads supported for pivotal motion about an axis parallel to the axis of rotation of the shaft being supported. The pivoting is generally provided by the flexing of the support structure for the bearing pad. The flexing occurs during rotation, as the fluid pressure builds at the bearing surface. In this manner, a wedge of fluid is formed between the bearing surfaces. A typical bearing of this construction is described in U.S. Pat. No. 5,513,917, which issued to Ide, the disclosure of which is incorporated herein by reference.

As described in the reference Ide, hydrodynamic bearings may be constructed by electric discharge machining (EDM) from a solid metal cylinder. These bearings have proven very effective at high speeds and are frequently used in turbines and other applications where high rotational speeds are reached. A problem arises as the size of the bearings increase to over three inches in diameter, as the replacement of such bearings becomes increasingly expensive. This is due to the unitary nature of hydrodynamic bearings constructed by EDM in which the pads, support and base are machined from a single element. In the larger bearings, there is, therefore, a need for a modular construction so that the individual parts may be repaired or replaced separately. It is a purpose of this invention to provide a modular bearing in which the bearing pad, the bearing support, and housing can be disassembled and repaired by the replacement of individual parts.

An additional problem which arises in the larger hydrodynamic bearings of a unitary type is their general inability to accommodate shaft misalignment or deflection. It is a purpose of this invention to construct a bearing support system that provides for additional pivotal motion about an axis transverse to the axis of rotation of the shaft being supported. This will allow the bearing pad to move in response to the stresses of misalignment.

SUMMARY OF THE INVENTION

A bearing is constructed of an assembly of three basic components, namely a bearing pad, an I beam shaped support element and a base. The I beam consists of inner and outer flanges connected by an intermediate web. The bearing pad is removably attached to the inner flange of the support element and the outer flange is removably attached to the base. Hydrodynamic bearing operation is provided by constructing the intermediate web so that it flexes about a linear pivot axis which is parallel to the axis of rotation of the supported shaft. In addition, the outer flanges are constructed to engage the base for pivotal motion about a linear axis which is transverse to the axis of rotation of the supported shaft. This is accomplished by constructing the outer mating surface of the outer flange with a second cylindrical curvature to allow a rocking movement on a stub shaft inserted at the interface of the outer flange and the base.

DESCRIPTION OF THE DRAWINGS

The invention of this application is described in more detail below with reference to the Drawing in which.

DESCRIPTION OF THE PREFERRED EMBODIMENT

Figure 1:
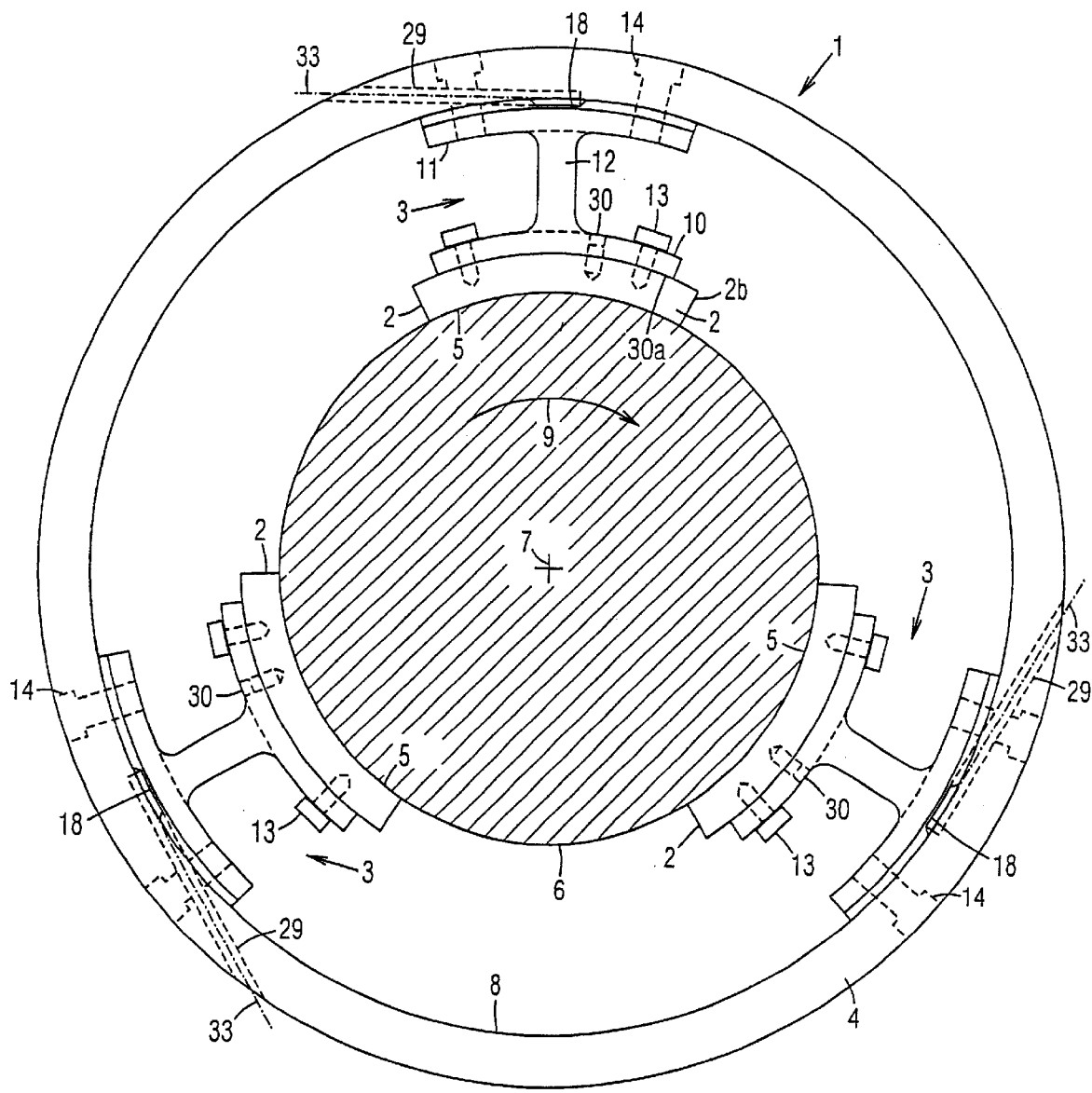
FIG. 1 is an end view of the bearing of this invention.

A hydrodynamic bearing 1, as shown in FIG. 1, is constructed with a bearing pad 2, attached to a support element 3 which is in turn supported within a bearing housing 4. Bearing surface 5 of pad 2 engages shaft 6 to allow rotation of the shaft 6 about its axis 7. The bearing pad 2 and housing 4 have cylindrically curved surfaces, 5 and 8, which are concentric with the axis of rotation 7. For purposes of describing the relationship of the components, the terms inner and outer will refer to a radial direction with the innermost point being on the axis of rotation 7 and the outermost point being at the exterior of the housing 4. Another reference which will be used is to the leading and trailing edges, 2a and 2b respectively, of the bearing pad 2. The leading edge 2a is the first edge past by a point on the shaft moving in the direction of rotation as shown by the arrow 9 in FIG. 1.

Figure 2A:
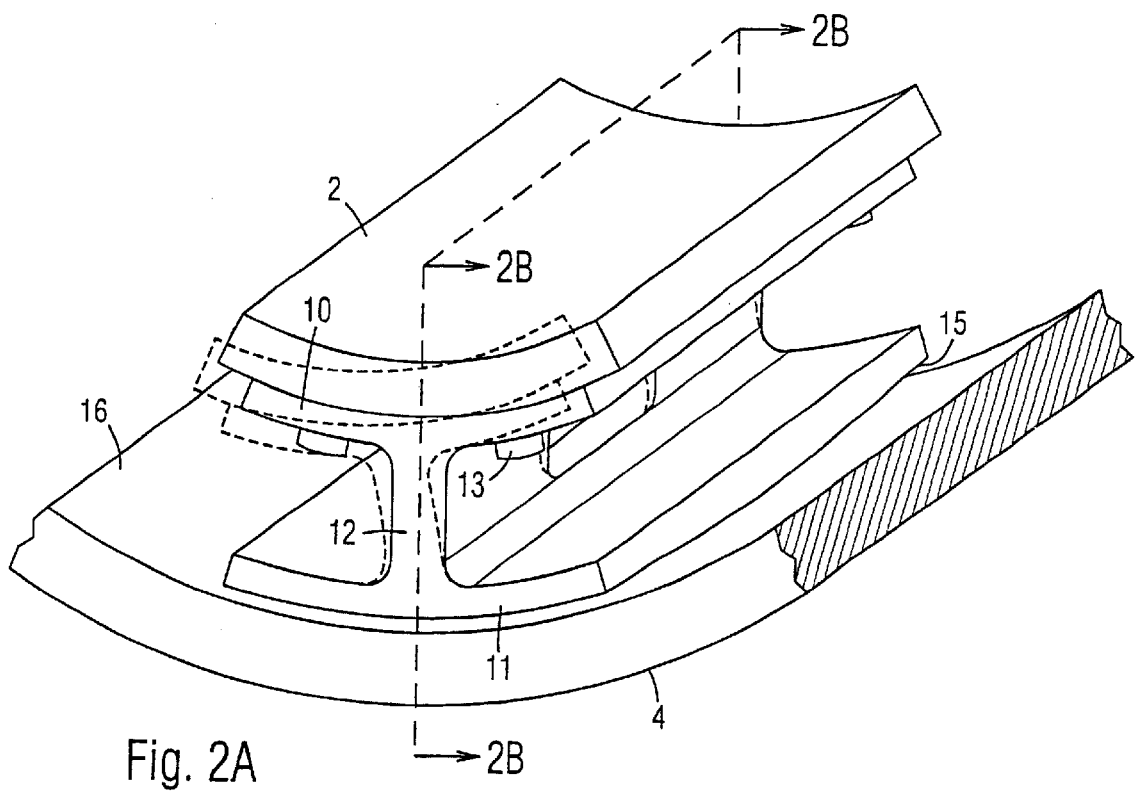
FIG. 2A is a perspective view of a single bearing element of this invention.
Figure 2B:
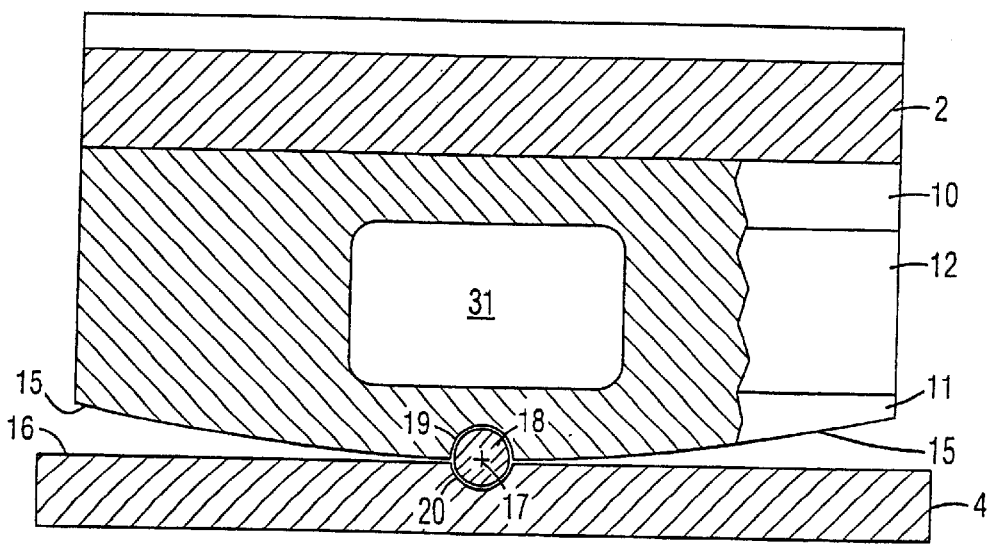
FIG. 2B is a sectional view along section lines 2B, showing the secondary pivot axis of the bearing support structure of this invention.
Figure 3:
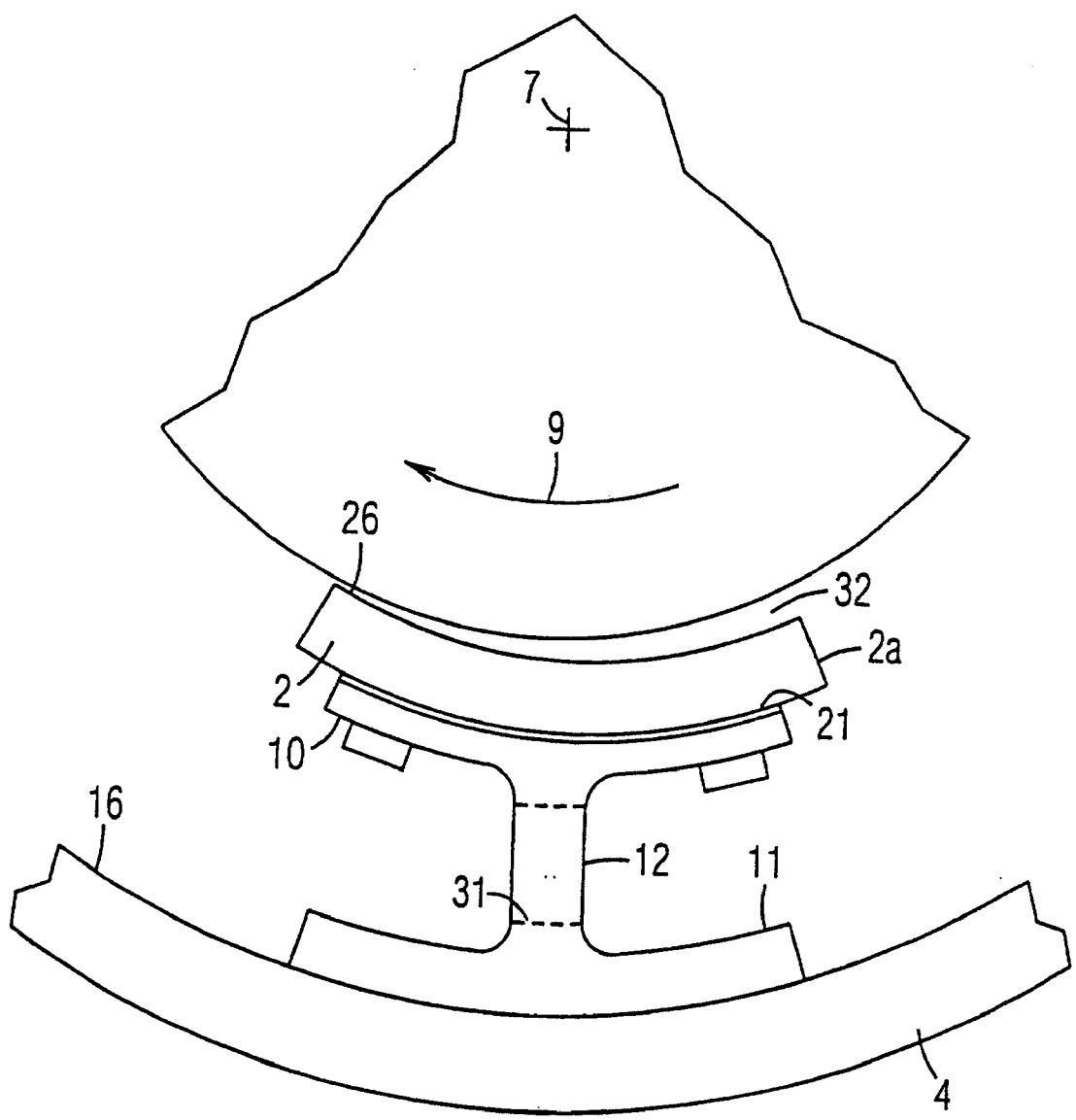
FIG. 3 is an end view of a single bearing element of this invention showing hydrodynamic operation.

The support element 3 is constructed having an I shaped cross section, as shown in FIGS. 1 through 3, and consists of an inner flange 10, an outer flange 11, interconnected by a web 12. As shown in FIGS. 1 and 2a, the bearing pad 2 is attached to the inner flange 10 by means of fasteners 13. Fasteners 13 are high strength machine screws which allow the pad 2 to be disassembled from the support element 3 for repair. The web 12 is constructed for limited flexibility about a linear axis parallel to the rotational axis 7 of the shaft 6. This flexibility allows the bearing 1 to function as a hydrodynamic bearing, namely, a bearing in which the bearing pad tilts away from the shaft at its leading edge, as shown in FIG. 3. This is to allow the formation of a wedge of lubricating fluid 32 at the bearing surface which converges from the leading edge to the trailing edge under the forces operating at the bearing surface.

This flexing (see phantom lines in FIG. 2A) primarily occurs in the interconnecting web 12 and therefore, the design of the web 12 is important. As shown in FIGS. 1–3, the web 12 is formed in two sections which are divided by an opening 31. The two sections flex as one element about a linear axis which is parallel to the axis of rotation 7. The opening 31 may be adjusted to alter the flexing characteristics. It also provides a convenient passage for circulating oil. The flexing of the web is important to the formation of an optimal hydrodynamic wedge 32, see FIG. 3. To insure radial compressive rigidity and axially aligned flexibility, the web 12 is formed in a planar shape with the axially aligned dimension longer than the radially extending dimension. This tends to reduce cross coupling and the resulting undesirable instability, premature wear, and failure.

Figure 4:
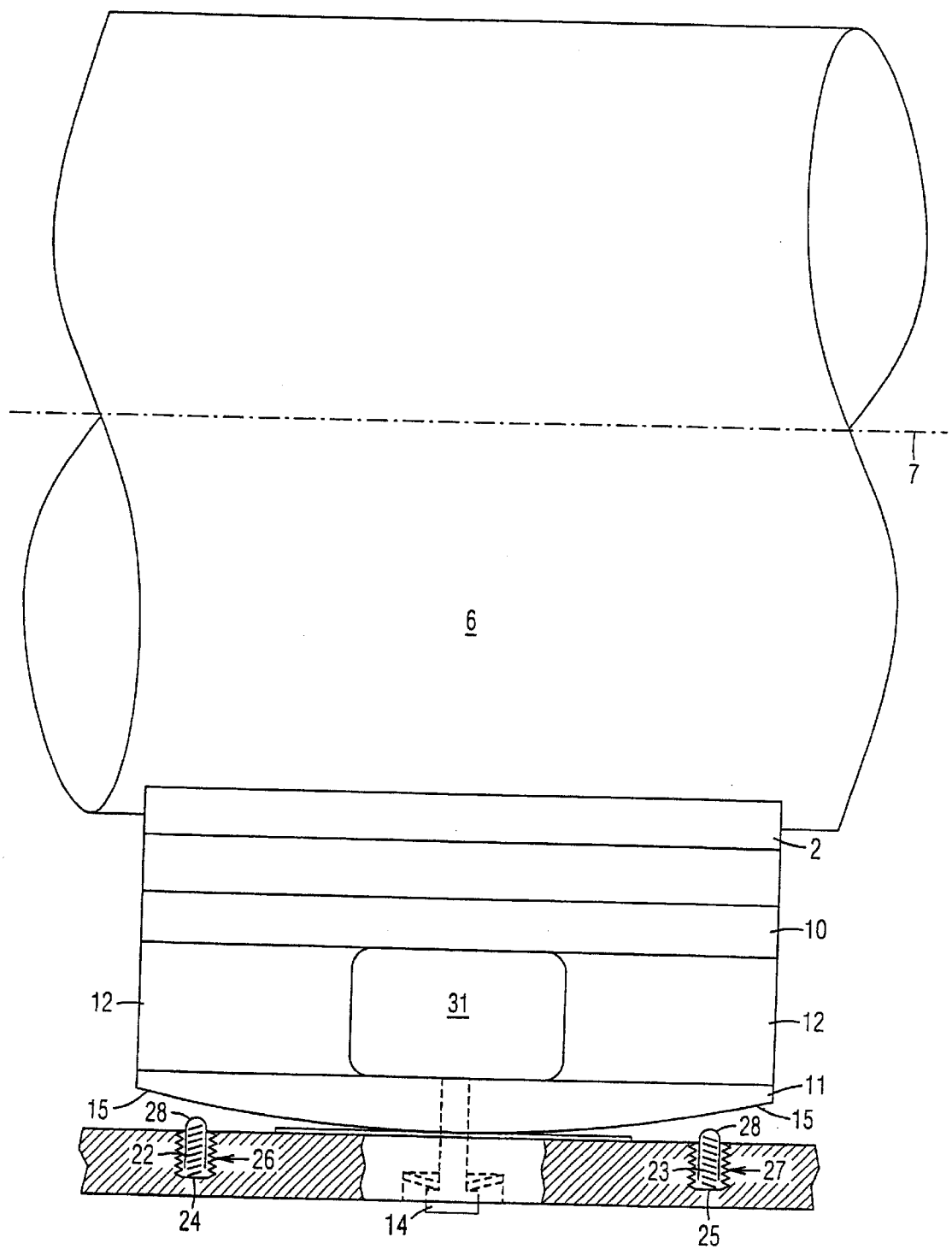
FIG. 4 is a leading edge view of a single bearing element of this invention, showing the secondary curvature.

The outer flange 11 of the support element 3 is attached to the bearing housing 4 by means of machine screws 14, as shown in FIGS. 1 and 4. The screws 14 are attached through the transverse axis of rotation described below and have sufficient flexibility to allow a rocking motion. The outer surface 15 of outer flange 11 is generally cylindrical and has an axis and a radius of curvature substantially the same as that of the inner surface 16 of housing 4, as shown in FIG. 2A. In order to accommodate the misalignment of the shaft 6, either during installation or as the result of bending, the surface 15 of the outer flange 11 is constructed with a second curvature, as shown in FIG. 2B. The compound curvature of surface 15 allows a rocking motion of the support element about an axis 17 which is transverse to the axis of rotation 7. Because of the nature of the second curvature of surface 15, it will engage surface 16 along a line which coincides with the desired transverse axis of rotation 17. For the purpose of locating the support element 3 at its proper position and to promote the rocking action, a stub shaft 18 is placed with its axis coincident with the axis on 17 along a tangent to the second curvature of surface 15. Matching semi-cylindrical grooves 19 and 20 are constructed in the outer surface 15 and inner surface 16 respectively to receive the stub shaft 18. In order to install the stub shaft 18, a passages 29 are drilled through housing 4 along an axis 33 which is tangent to the inner surface 16.

Since the bearing pad 2 is a separate part, more design latitude is achieved. For example, to control preload and adjust tolerances and orientation, a flat shim 21 may be inserted between the pad 2 and the inner surface of inner flange 10, as shown in FIG. 3. This can also be accomplished during repair or overhaul of the bearing, if adjustment of the radial position of the bearing pad 2 is necessary. In order to insure accurate reassembly of the pad 2 with the support element 3, locating pins 30 may be used, as shown in FIG. 1.

In some instances, it may be desirable to provide increased resilience to the transverse rocking motion. To accomplish this, springs 22 and 23 are disposed between the inner surface 15 of outer flange 11 and the inner surface 16 of housing 4 on either side of pivot axis 17. Bores 24 and 25 are drilled in surface 16 to receive damper assemblies 26 and 27 such, as those shown in FIG. 4. These assemblies may comprise caps 28 which enclose springs 22 and 23 and provide a rigid contact surface for engagement with surface 15. As shown in FIG. 4, the damper assemblies 26 and 27 do not come into operation until deflection of the bearing pad 2 about axis 17 exceeds a predetermined amount. In this manner, the resilience provided for the rocking motion along the transverse axis 17 may be adjusted to provide continuous or dual modes of operation.

Figure 5:
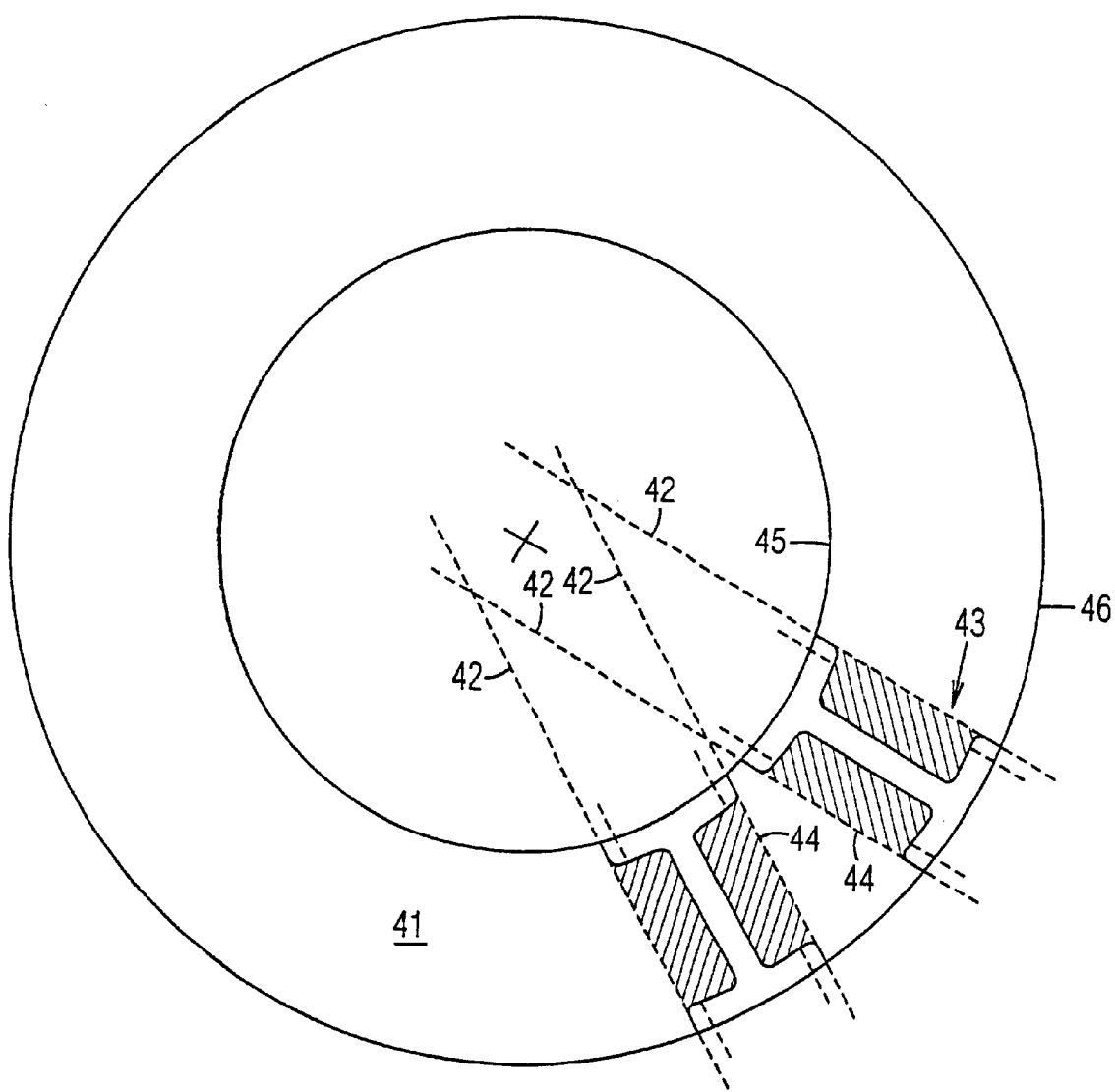
FIG. 5 is a schematic view of one method of constructing the pad support component of this invention.

The support element 3 is manufactured by turning a cylindrical piece of metal stock, as shown in FIG. 5, having an axial length of a predetermined dimension, to the desired inner and outer diameters 45 and 46 respectively. The intermediate blank 41 thus formed is then placed in a mill where all the holes for the inner and outer flanges 10 and 11 are drilled. The blank 41 is then cut along lines 42 to form individual support element blanks 43. A final milling step removes the material indicated by the cross-hatching 44, thus defining the flexible web 12 and completing the support element 3. The compound curvature of outer surface 15 of the outer flange 11 may be machined in a final step in the fabrication before assembly. To minimize the build up of tolerance errors, the support elements are assembled within the bearing housing 4 and the inner bearing diameter is finish machined to tolerance.

Figure 6:
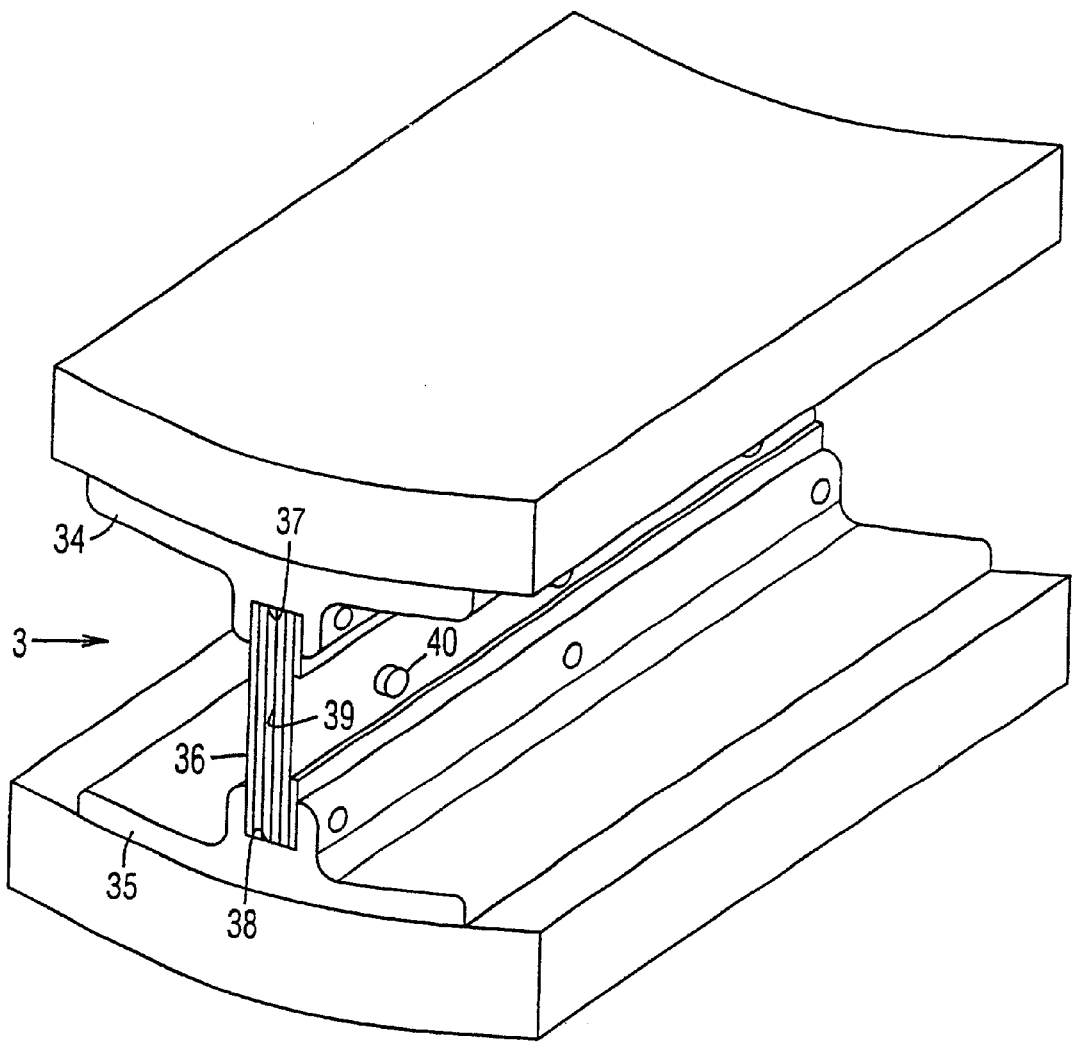
FIG. 6 is a perspective view of an alternate embodiment of the support component of this invention.

Referring now to FIG. 6, in which another embodiment of the invention is shown, the support element 3 is constructed in three separate components, namely an inner flange 34, an outer flange 35 and an intermediate web 36. Inner flange 34 and outer flange 35 are constructed with channels 37 and 38, respectively, into which web 36 is fastened. The web 36 is a lamination of flexible plates 39 and is oriented in a plane which is perpendicular to a plane tangent to bearing pad 2. Buckling restraints, consisting of fasteners 40, pass through the middle portion of the web 36, and secure the laminations 39 against first mode buckling. Additional restraints (not shown) may also provided which limit second mode buckling as well.

An advantage of this embodiment is that the flexibility of the web 36 is improved while a high resistance to buckling is obtained. It also has a safer failure mode under some circumstances to the one piece web 12 of FIG. 1.

Figure 7:
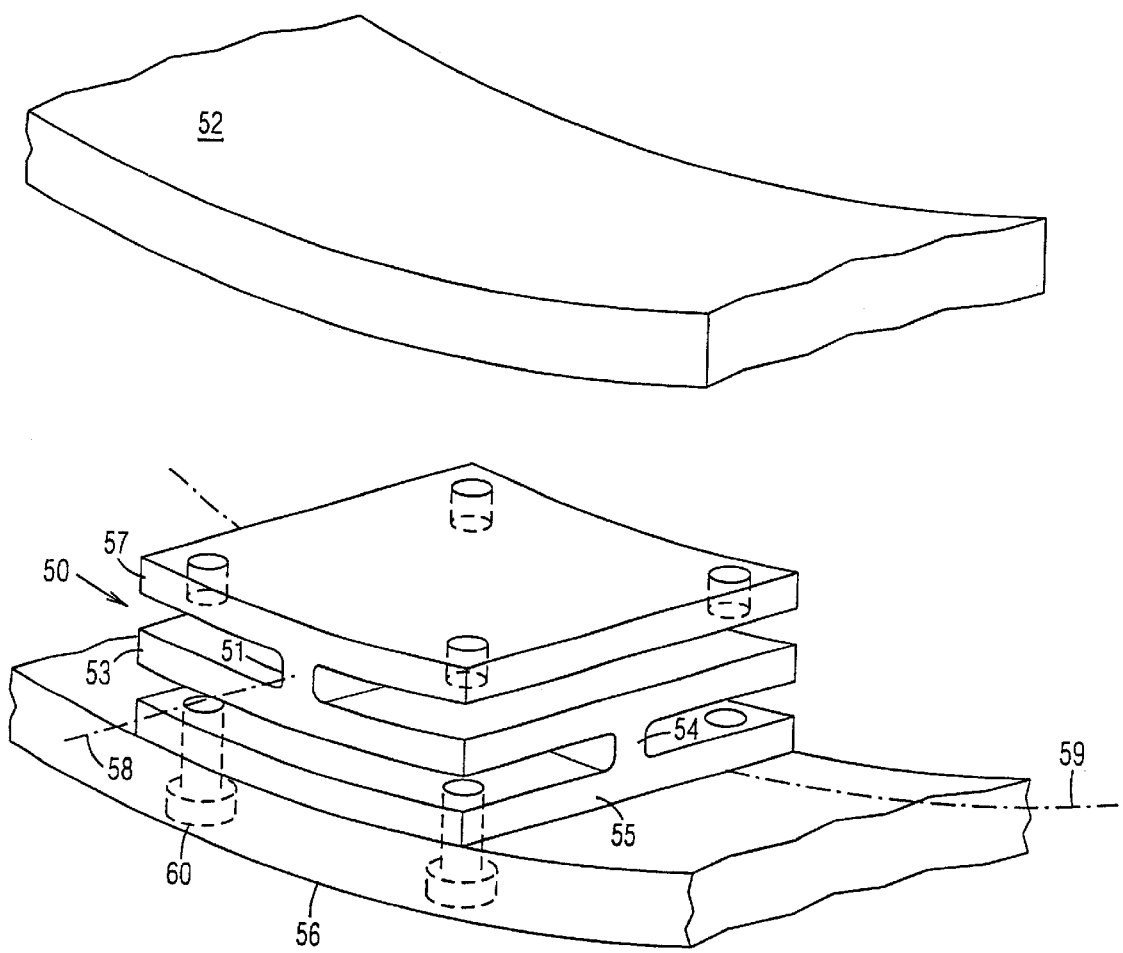
FIG. 7 is a perspective view of an alternate embodiment of this invention.

In the embodiment shown in FIG. 7, the flexibility of the assembly in the direction transverse to the axis of rotation is provided by a secondary web 54. In this embodiment, a support structure 50 is constructed by electric discharge milling from a single piece. An inner flange 57 provides a seat for the bearing pad 52 which is fixed to the flange by means of machine screws (not shown) or other means which allows replacement of the pad 52. The web 51 extends from the inner flange 57 radially outward to an intermediate flange 53. Web 51 allows a pivoting of the pad 52 about an axis 58 which is parallel to the axis of rotation. This pivoting allows hydrodynamic operation of the bearing in a well known manner.

A second web 54 extends from the intermediate flange 53 to an outer flange 55 in a plane generally perpendicular to the axis of rotation. The web 54 is constructed to allow flexing about a curved axis 59 which provides the transverse resilience to accommodate axial bending of the supported shaft. Outer flange 55 is removably connected to the bearing housing 56 by machine screws 60. This embodiment provides an integral support structure having resilience both axially, to provide hydrodynamic performance, and transversely to compensate for misalignment or bending of the shaft.

I claim:

1. A bearing for supporting a shaft for rotation about an axis constructed for use in high rotational speed applications, said bearing having radially inner and outer components relative to the rotational axis of the shaft comprising:

a bearing pad having an inner bearing surface constructed with a curvature for engaging a shaft for rotation about the axis and an outer surface for connection to a support;

a support element detachably connected to the bearing pad at the outer surface of the bearing pad; and an outer housing surrounding the bearing and having an inner surface for connection to the support element, said support element further comprising:

an intermediate web constructed to flex about a first axis parallel to the axis of rotation to generate hydrodynamic performance, said web having inner and outer ends; and being constructed with at least one opening extending through the web to provide enhanced flexibility and allow the passage of oil;

a first flange constructed at the inner end of the web and having an inner supporting surface to receive the bearing pad; and a second flange constructed at the outer end of the web and being detachably connected to the housing, said flange having means for engagement with the inner housing surface to allow a rocking motion of the support element about a second axis transverse to the axis of rotation.

2. A bearing for supporting a shaft for rotation about an axis constructed for use in high rotational speed applications, said bearing having radially inner and outer components relative to the rotational axis of the shaft comprising:

a bearing pad having an inner bearing surface constructed with a curvature for engaging a shaft for rotation about the axis and an outer surface for connection to a support;

a support element detachably connected to the bearing pad at the outer surface of the bearing pad; and an outer housing surrounding the bearing and having an inner surface for connection to the support element, said support element further comprising:

an intermediate web constructed to flex about a first axis parallel to the axis of rotation to generate hydrodynamic performance, said web having inner and outer ends;

a first flange constructed at the inner end of the web and having an inner supporting surface to receive the bearing pad; and a second flange constructed at the outer end of the web and being detachably connected to the housing, said flange having means for engagement with the inner housing surface to allow a rocking motion of the support element about a second axis transverse to the axis of rotation, said means to allow a rocking motion further comprising a compound curvature constructed on an outer surface of the second flange and further comprising:

a first curvature having an axis of curvature substantially corresponding to the axis of curvature of the inner surface of the housing; and a second curvature having an axis of curvature transverse to the axis of curvature of the inner surface of the housing wherein said curvatures will engage along a line to form the second axis of rotation.

3. The bearing according to claim 2, wherein the second flange is connected to the housing by means of removable fasteners, the longitudinal axes of which intersect the second axis of rotation and extend radially in relation to the second curvature.

* * * * *

UNITED STATES PATENT AND TRADEMARK OFFICE
CERTIFICATE OF CORRECTION

PATENT NO.     : 6,379,046 B1
DATED          : April 30, 2002
INVENTOR(S)    : Fouad Y. Zeidan It is certified that error appears in the above-identified patent and that said Letters Patent is hereby corrected as shown below:

<u>Title page,</u>
Add the following: -- Related U.S. Application Data [63] Divisional of application no. 09/095,413 filed on June 10, 1998, now Patent No. 6,170,989. --

Signed and Sealed this

Fifteenth Day of October, 2002

*Attest:*

*Attesting Officer*

JAMES E. ROGAN
*Director of the United States Patent and Trademark Office*